Aug. 3, 1948.  J. E. SOCKE  2,446,198
METHOD OF CUTTING BLANKS
Filed Nov. 16, 1945  4 Sheets-Sheet 1
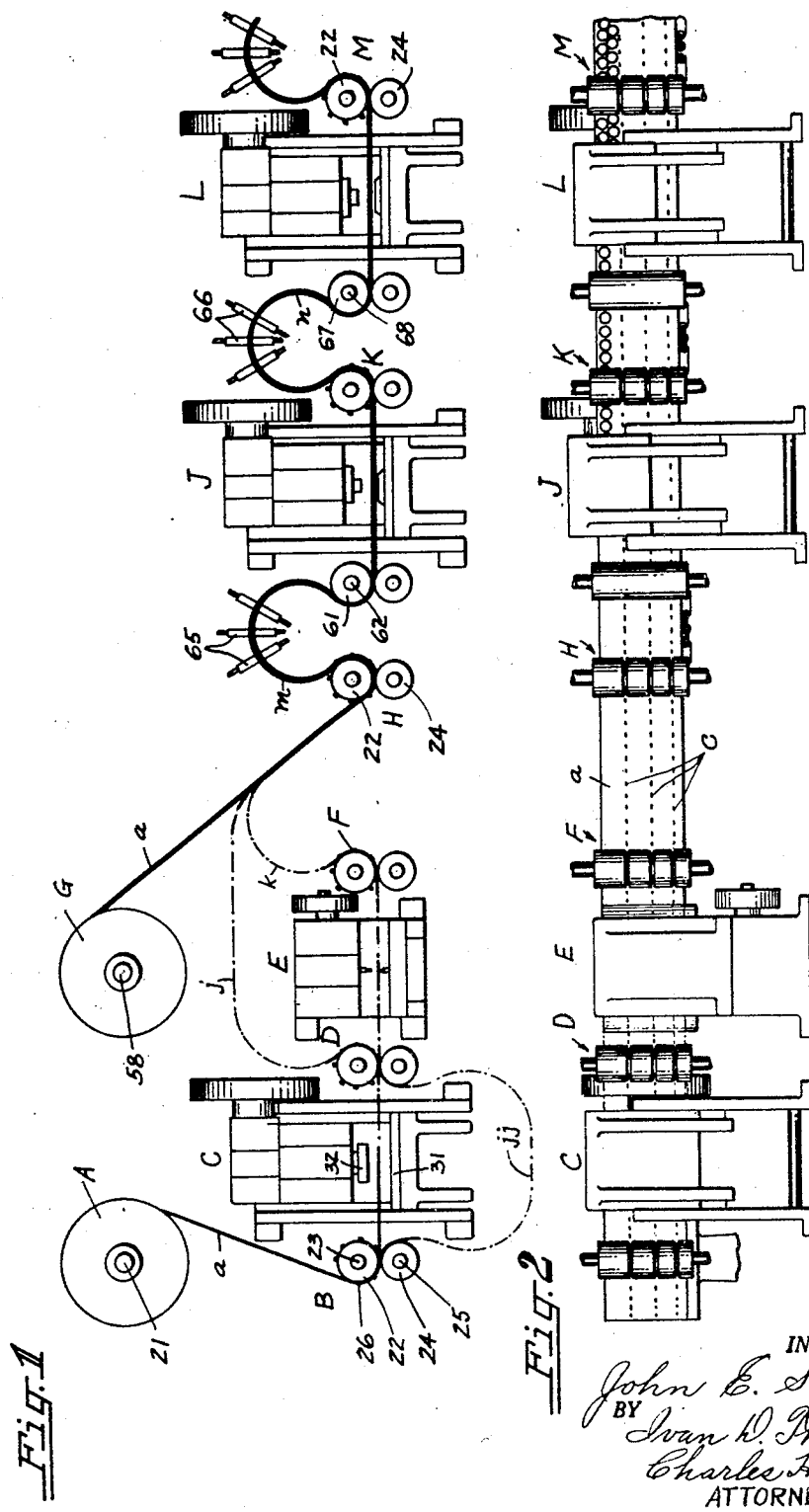
INVENTOR.
John E. Socke
BY Ivan D. Thornburgh
Charles H. Erne
ATTORNEYS Aug. 3, 1948.   J. E. SOCKE   2,446,198
METHOD OF CUTTING BLANKS
Filed Nov. 16, 1945   4 Sheets-Sheet 2
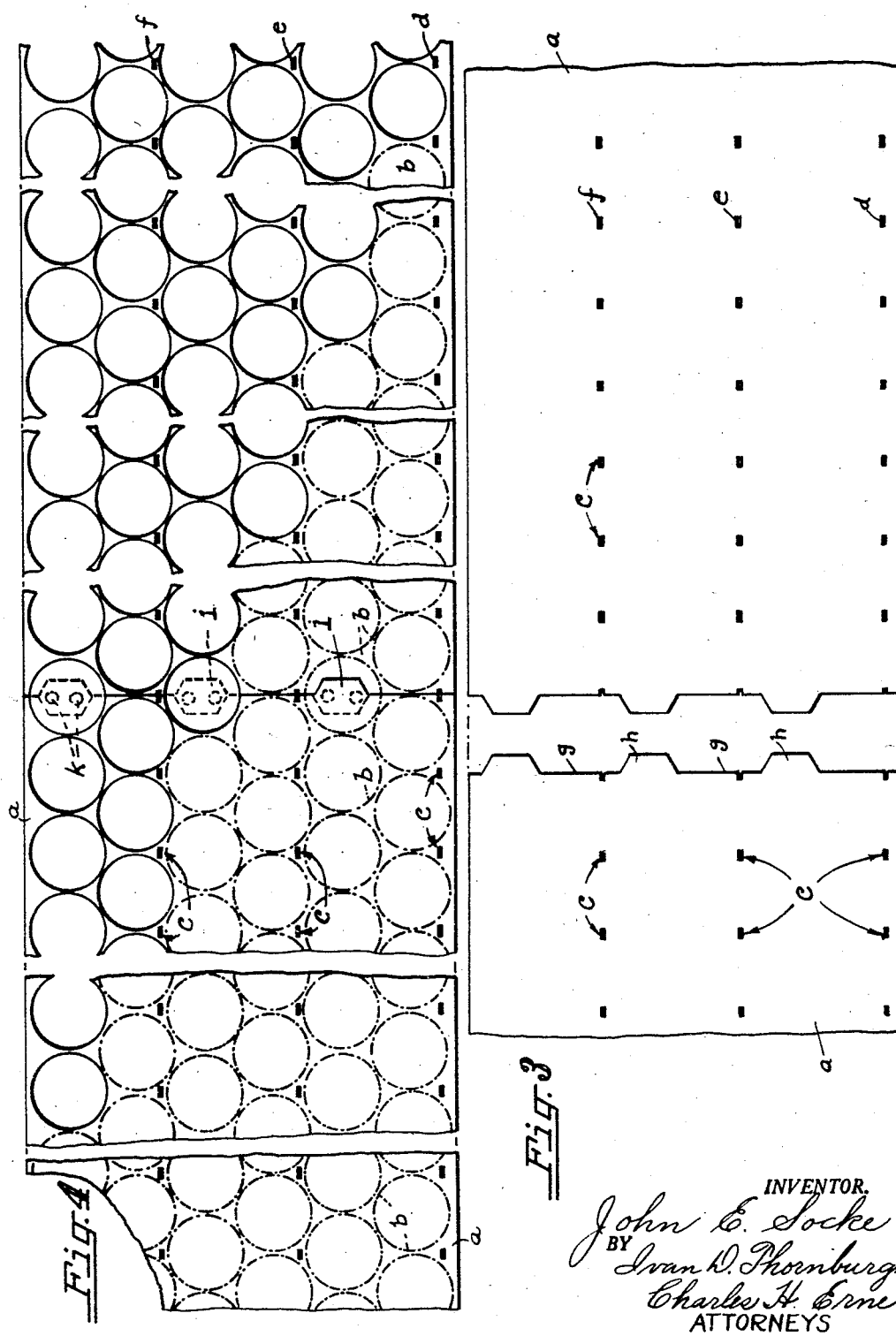
INVENTOR.
John E. Socke
BY
Ivan D. Thornburgh
Charles H. Erne
ATTORNEYS Aug. 3, 1948.                    J. E. SOCKE                    2,446,198
                           METHOD OF CUTTING BLANKS
Filed Nov. 16, 1945                                          4 Sheets-Sheet 3
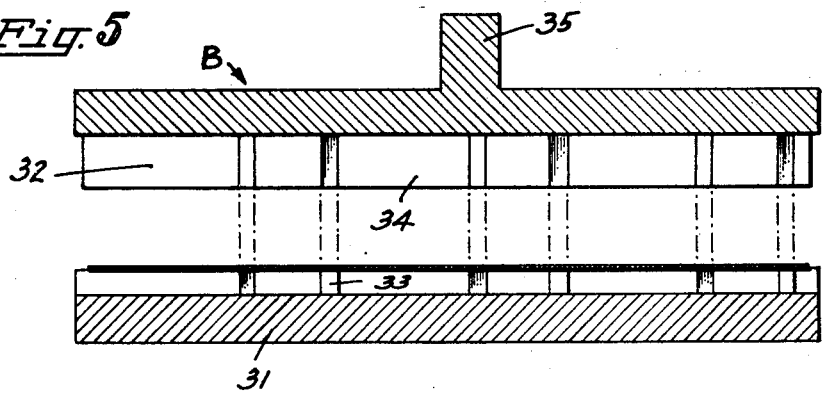
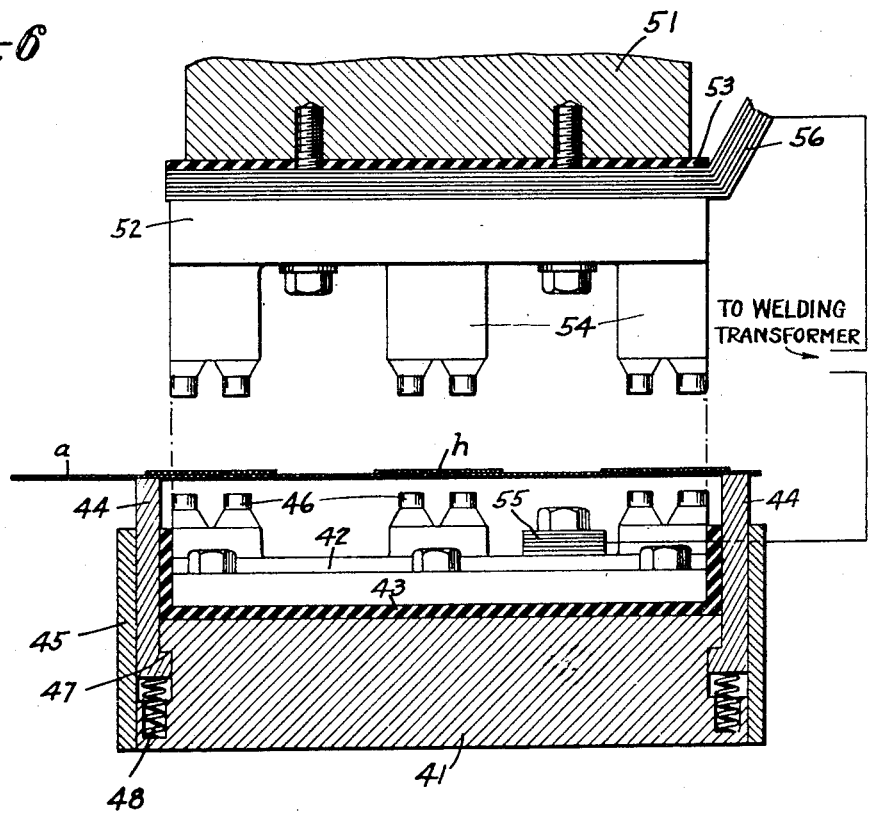
INVENTOR.
John E. Socke
BY Ivan D. Thornburgh
Charles H. Erne
ATTORNEYS Aug. 3, 1948.　　　J. E. SOCKE　　　2,446,198
METHOD OF CUTTING BLANKS
Filed Nov. 16, 1945　　　　　　　　　　4 Sheets-Sheet 4
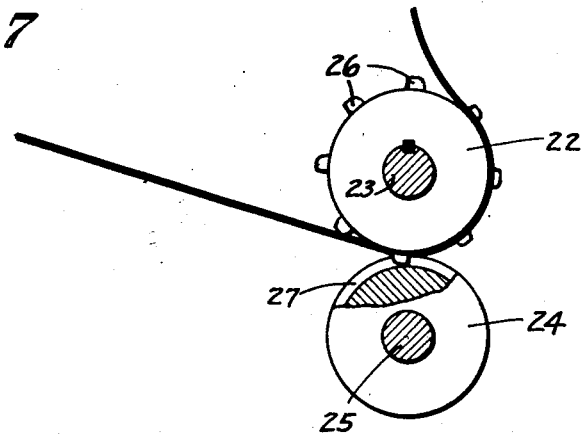
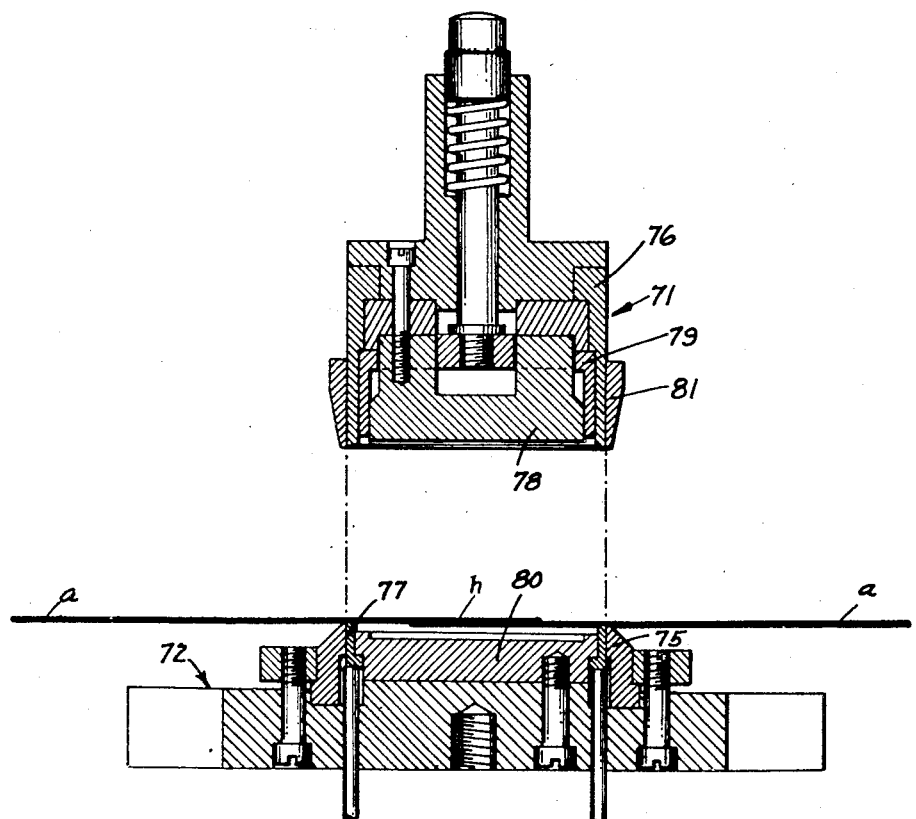
INVENTOR.
John E. Socke
BY Ivan D. Thornburgh
Charles H. Erne
ATTORNEYS Patented Aug. 3, 1948

2,446,198

UNITED STATES PATENT OFFICE 2,446,198

METHOD OF CUTTING BLANKS

John E. Socke, Pelham Manor, N. Y., assignor to American Can Company, New York, N. Y., a corporation of New Jersey Application November 16, 1945, Serial No. 629,129

6 Claims. (Cl. 164—17)

The present invention relates to the handling of metallic strips for cutting can ends or the like therefrom and has particular reference to a novel manner of securing strips together to preserve a continuous cutting pattern irrespective of the number or the lengths of individual strips, thus minimizing wastage of the material or of can ends and without damage to the cutting mechanism.

In high speed production for the manufacture of blanks, such for example as can ends, it is desirable to utilize a strip of stock containing a plurality of rows of potential blank spaces which provide the individual stock area for the can ends. Usually the most economical use of the strip area when the cutting line is circular, oval, etc., is an arrangement of blank spaces in the well known staggered layout this being a cutting pattern wherein there is a minimum of scrap spacing between adjacent cutting outlines.

Irrespective of the pattern, as can ends or other blanks are removed from a strip it is important not to waste material at the end of a strip being cut and in like manner not to waste material at the leading end of a subsequent strip. In other words, it is highly desirable to maintain the efficient cutting pattern from strip to strip and to avoid waste in changing over from one strip to another.

The present invention contemplates a cutting of blanks from rows of potential can end spaces in an accurate manner. The strip constituting the stock from which the blanks are cut is under accurate feeding conditions at all times. For such accurate feeding the strips are previously formed with rows of gauging and feeding perforations and all of the strips so handled have these accurately spaced perforations. As one strip approaches exhaustion of its can end spaces by the cutting action, the steps of the method provide that a second strip becomes available for immediate use the area of which bears a definite relation to the strip being cut. In this way the cutting operation may continue through the completion of the first strip and into the new strip.

An object of the present invention is the provision of a method of cutting blanks from strips containing rows of potential blank spaces from which can ends or similar articles may be cut wherein each strip, previously prepared for accurate cutting according to a desired pattern, is joined to a second previously prepared strip in a manner to provide for an uninterrupted continuation of the cutting pattern.

Another object of the invention is the provision of a method of handling strips wherein rows of gauging and feeding perforations in the strip are used for advancing the strip incident to formation of can ends or the like according to a certain cutting pattern, such a method providing for supplying a second strip to take the place of a strip being cut when the latter is exhausted by associating the ends of the strips in a definite pattern and by securing the two strips together prior to the exhaustion of spaces in the one strip thereby maintaining the cutting efficiency of the pattern.

Yet another object is the provision of a method of transversely cutting perforated strips as by notching one edge so that alignment edges and overlapping projections are formed for securing the strip ends together in definite relationship to provide a composite strip having an uninterrupted cutting pattern which will yield the maximum number of can ends or the like in the can end cutting and forming operation, the connecting overlapped sections of the strip ends being contained fully within certain of the can ends cut so that these certain ends may be discarded when cut, without interfering with high speed operation.

Numerous other objects and advantages of the invention will be apparent as it is better understood from the following description, which, taken in connection with the accompanying drawings, discloses a preferred embodiment thereof.

Referring to the drawings:

Figure 1 is a diagrammatic plan view of a manufacturing line of machines for carrying out the steps of the invention, such machines handling a composite strip of sheet material as stock for the cutting of can ends, the view also showing how the two ends of the strips forming the composite strip are shaped and secured together, such a composite strip having an uninterrupted cutting pattern;

Fig. 2 is a diagrammatic elevation of the machines shown in Fig. 1 the view also showing the strip being treated;

Fig. 3 is an enlarged diagrammatic plan view of the tail end of one perforated strip and the leading end of a second perforated strip and shows the results of transverse cutting of the two strips by notching the ends thereof;

Fig. 4 is a view similar to Fig. 3 showing the two strips joined together and indicating the cutting pattern of one strip extending uninterruptedly into the other strip;

Fig. 5 is a sectional view showing the principal parts of a notching press for preparing the ends of two strips to produce the results shown in Fig. 3;

Fig. 6 is a similar sectional view of principal parts of a spot welding machine for welding together the transversely cut and notched ends of the two strips producing the results shown in Fig. 4;

Fig. 7 is a face view of one of the feeding sprockets utilized to feed and hold the perforated strip at various positions for the various operations; and Fig. 8 is an enlarged sectional view of a can end cutting and forming press illustrating the connected overlapped ends of two strips in position within the dies of the press.

In the present invention strips which are used as stock contain a definite number of potential can end spaces and are provided with accurate gauging and feeding perforations all of which bear an exact relation to such spaces. Such perforations may be cut in the strip in any suitable manner, one way of cutting being shown in my pending application Serial Number 588,083, filed in the United States Patent Office April 13, 1945.

The ends of the strips are formed to insure easy attachment of one strip to another without disturbing the relationship of the feeding and gauging perforations or the relationship of potential can end spaces in all strips. The composite strip formed when two strips are joined together contains the full cutting pattern which extends throughout the full length without interruption from strip to strip.

In the steps illustrated in the drawings and described in the specification one satisfactory series of operations for handling strip stock is given by way of example. Each strip is advanced through the various stations by feeding engagement in the perforations. Thus feeding and also holding of the strip is effected at all times with great accuracy.

These gauging and feeding perforations in accordance with the present invention have an additional function in that they constitute reference points for the preparation of the ends of different strips incident to two strips being joined together. When two prepared strips are secured together to provide an augmented supply of stock and to form the composite strip referred to there is no interruption or variation of the spacing of adjacent gauging and feeding perforations in a row running through both strips and the perforations are used for feeding and for locating the strip ends.

In Figs. 2, 3 and 4, inclusive, there is disclosed a strip a of definite width which constitutes the stock for the method steps. Strip a contains a pattern of potential can end spaces b this embodiment showing the spaces arranged in six rows throughout the width of the strip. Each row is staggered in its relation to the adjacent row this being a conventional layout. Gauging and feeding perforations c are cut in the strip a in exact relationship to the pattern of the can spaces b there being disclosed three rows of perforations. These perforations may be punched in the strip at any desirable time and in any suitable manner, more details as to this being disclosed in my copending application mentioned above.

In the outline of perforations shown an outer row of perforations d is cut in the strip parallel to and closely adjacent the lower edge as the strip is held in a vertical position, this being the preferred position of the strip as it is passed through the various machines. An intermediate row of perforations e is spaced inwardly or above the row d, each perforation of the row e aligning vertically with the corresponding perforations in the row d. An inner or top row of perforations f is also formed in the strip and this row extends parallel to the other rows d and e and perforations within this row align vertically with corresponding perforations in the rows d and e.

According to the present invention provision is made for trimming one end of each perforated strip a so that at the proper time such a strip can be secured to the end of another perforated strip. The two strips then are joined together in an exact relationship so that there will not be any variation in the spacing or in the alignment of the perforations c in the various rows d, e and f. Since these perforations bear an exact relation to the can end spaced b, the pattern in this instance being a stagger layout of six rows, these six rows of spaces will continue without interruption across the junction between two adjacent strips.

Figure 3 illustrates graphically one transverse line or style of cut for corresponding end edges of two strips a to be joined. In this form of cut there are four sections which provide transverse alignment lines or edges g. All of these sections are in a vertical line which passes through the center of aligned perforations in the rows d, e and f. Sections g are interspersed with three projections h each projection spacing two adjacent alignment edge sections. When the two strips are assembled with their associated alignment sections g together, the projections h of the strips will overlap each other, as illustrated at i in Fig. 4.

When in this assembled position the overlapping projections h are joined in a suitable manner as by spot welds k. This preserves the desired relation in the two strips of the line of perforations c in the rows d, e and f and also maintains a continuing relation of the potential can end spaces b. This insures the proper handling of the strips and insures an uninterrupted continuation of the cutting pattern irrespective of how many strips are joined together as stock.

It will be noted that the overlapped projections h (Figs. 3 and 4) in this particular cutting pattern are centered along the second, fourth and sixth rows reading from the bottom of the potential can end spaces. This positions the entire overlapping connections held by the welds k along the potential line of juncture, inside of the cutting lines of the potential can end spaces b in the second, fourth and sixth rows. The ends cut from these spaces since they contain overlapped ends of two strips are defective and will be discarded.

The particular time of notching the ends of a strip incident to securing two strip ends together is subject to considerable variation. All of the strips may be fully prepared and secured together prior to passing them into the manufacturing line. In some cases the preparing of the strip ends and the securing of the ends of two strips together may take place in close relation to the actual treating steps in the manufacturing line. In Fig. 1 there is disclosed the manufacturing line for producing the can ends from a strip a and there is also shown as a preparatory step of this line the necessary machines for notching strip ends and for securing the ends of two strips together by spot welding.

Before describing in detail the course of a strip $a$ through the various machines in the manufacturing line attention will be given to this preparation of the strip ends. This includes notching the strip ends to produce the spaced alignment edges $g$ and the projecting sections $h$.

One of the strips of material $a$ when received for notching and welding of the strip end is preferably reeled or coiled upon a spool A. The spool with its stock may be carried upon a vertical shaft 21 from which the strip may be uncoiled. A feed sprocket 22 (see also Fig. 7) is located adjacent the shaft 21 in position B. This sprocket is mounted upon a vertical shaft 23 and provides for the uncoiling of the stock from spool A. It also assists in holding the strip accurately for notching. A grooved roller 24 mounted upon an idler shaft 25 is used to keep the teeth of the sprocket in proper feeding register with the perforations $c$ in the strip. The shaft 23 is rotated in any suitable manner to perform this uncoiling and holding of the strip.

The feed sprocket 22 is formed as a cylindrical drum having three rows of projecting teeth 26 (Fig. 7) which pass into the perforations $c$ during the feeding operation. The roller 24 is grooved at 27 and there are three such grooves arranged to cooperate with the three rows of sprocket teeth 26. These grooves provide clearance for the sprocket teeth and insure that the cylindrical drum portion of the sprocket and the periphery of the groove rollers engage the strip for feeding and holding purposes.

The sprocket 22 positions the leading end of the strip $a$ into a notching mechanism C. Such a mechanism is illustrated in some detail in Fig. 5 and is adapted for notching two strip ends at one time, i. e., the strip being uncoiled from the spool A and a second strip. The notching mechanism comprises a stationary die plate 31 and a movable punch 32. The die plate 31 carries suitable notching dies 33 which are of proper shape and are spaced to provide the transverse lines of cut illustrated in Fig. 3. Cooperating punch elements 34 are adapted to move into register with the cutting edges of the dies 33 in order to produce the abutting edges $g$ and the projections $h$ in the two strip ends. The punch member 32 may be mounted upon a punch stem 35 by means of which the punch is moved in conventional manner to cooperate with the notching dies.

On the opposite side of the notching mechanism C a second set of feed sprockets 22 and grooved roller 24 are located. This is at the position marked D in Fig. 1. These are used for holding the tail end of the second strip in proper position within the notching mechanism. There are many of these feeding sprockets and rollers used in various places, as will be pointed out, and all are properly synchronized and timed to engage their sprocket teeth 26 in the proper gauging and feeding perforations $c$.

After the forward end of a strip and the tail end of a second strip are notched to produce the ends disclosed in Fig. 3, the notched edges are assembled so that the alignment edges $g$ come together and the projecting sections $h$ overlap. This assembled position is illustrated in Fig. 4. The strip ends are then in condition for joining. Figure 1 illustrates a suitable welding mechanism E for this purpose. A third set of feed sprocket and groove roller may be used on the opposite side of the welding mechanism as shown at F.

The welding mechanism E comprises a stationary bed plate 41 (Fig. 6) on which may be mounted a stationary welding electrode unit 42. This unit is secured to the base plate 41 but is insulated therefrom as by a cup shaped insulating member 43. The base plate 41 also carries two slide members 44 which are spaced apart adjacent the ends of the base plate and which function as strippers. The slide members are held in sliding position by end plates 45. Each slide member 44 has sliding engagement between the end plate and the drawn rim of the insulating member 43.

The outer end of each slide member projects beyond the face of spaced electrodes 46 which may be an integral part of the electrode unit 42. The opposite or inner end of each slide 44 is enlarged as at 47 to provide a head for the slide. Coil springs 48 are seated in the base plate 41 and engage the enlarged head 47 of each slide and hold it normally in extended position. This is the position shown in Fig. 6.

The cooperating movable block, designated by the numeral 51, is disposed on the opposite side of the strip $a$ as it is positioned in the welding mechanism. This block carries an electrode unit 52. An insulating plate 53 insulates the electrode unit from the block. This concentrates the electrical energy for welding in the electrodes.

The electrode unit 52 preferably is formed with individual projecting electrodes 54, these being spaced apart and aligned with the electrodes 46 of the unit 42. Proper welding current is brought into the apparatus in any suitable manner as by way of the conventional welding transformer, through bus bars 55 which connect with the electrode unit 42 and similar bus bars 56 which connect with the electrode unit 52.

As illustrated in Fig. 6 the overlapping projections $h$ of the strip $a$ are located between the faces of the electrodes 46 and 54. When the block 51 is moved inwardly to clamp the strips $a$ between the electrodes the welding current passing into the apparatus secures the edges of the strips together in the spot welds $k$. It will be understood that preparatory to the clamping action of the electrodes on the strips, that the slides 44 move inwardly against the compression of the spring 48. This allows the connecting parts $h$ of the strips to be tightly clamped between the electrodes.

This description of the notching of two strips and of their junction by welding into a composite strip will apply equally to these operations at any time. As previously indicated this preparation may be performed on a number of strips and the various connected composite strips then may be coiled and wound on the proper spools.

However, the ordinary length of a strip $a$ is considerable and for practical purposes it is sometimes desirable to wait until a strip is nearly exhausted in the manufacturing line and then to stop the operations of the machines while the tail end of the nearly exhausted strip and the leading end of a new strip are subjected to notching and welding. In Fig. 1 there is indicated by dot and dash lines $j$ how the tail end of a strip $a$, which is in the manufacturing line and which will be referred to as the manufacturing strip is brought around and positioned in the feed sprocket 22 at position D. This manufacturing strip thereupon becomes the second of the strips handled in the notching and welding mechanisms, the leading edge of a new strip which will be called the spare strip then constituting the first strip for those operations.

After the tail end of the manufacturing strip in the manufacturing line is properly notched, the same may be withdrawn from the feed sprocket unit at D and is then inserted in the feed sprocket 22 at position F. This will properly locate the manufacturing strip for the welding operation. Dot and dash lines k indicate this positioning of the tail end of the strip under consideration.

It will be understood that the leading end of the spare strip after it has been notched will be removed from the notching mechanism C and will be passed around the notching mechanism and will be threaded through the sprocket 22 at position D and will be properly extended into the welding mechanism for the welding operation. This course of handling of the strip is indicated by the dot and dash lines jj and it will be observed that the sprocket at D therefore handles, but at different times, first the tail end of the manufacturing strip and later the forward end of the spare strip.

The feeding of the manufacturing strip a to the manufacturing line will now be described. This strip may be a single strip or it may be a composite strip prepared as just described. In any event, it will have an uninterrupted continuation of the cutting pattern throughout its length. The spool for holding the strip, indicated in Fig. 1 by the letter G, is mounted upon a vertical shaft 58 and the strip end is passed into a standard feed sprocket 22 and its grooved roller 24 at a position marked H. The operation of this feeding unit withdraws the strip of material from the spool G and passes it into machinery of the manufacturing line.

The feed unit which pulls off the strip a from the spool G preferably feeds it into a coil m and over an idler guide roller 61 mounted upon a vertical shaft 62. Radially disposed idler rollers 65 may be utilized to support the loop m as it passes from the feeding unit at H over to the guide roller 61. The strip thereupon is drawn through and is located in a cutting and forming press J by a feed sprocket 22 and grooved roller 24 located at position K.

The can end forming press J is the first of the can end cutting and forming units. In the event that the strip a being operated on contains only a single row of can end spaces b this will be the only press in use. If it is desired, the press J may be a multiple die press capable of operating upon two or more rows of can end spaces.

In Figs. 1 and 2 there is disclosed a second can end forming press L in addition to press J. The strip after passing through the press J and around the feed sprocket 22 at position K passes into a loop n as it did before in loop m. Suitable supporting rollers 66 may be used to support the strip and these rollers correspond to the rollers 65. The strip then passes to a guide roller 67 mounted upon a vertical axis 68. From roller 67 the strip a is drawn through the press L by a sprocket and grooved roller unit 22, 24 at a position M. From this position the line of travel of a strip if of further width, will continue in similar manner until all of the can end spaces b are removed from all of the rows of spaces in the strip.

It is believed that illustrating two of the can end feed presses as at J and L as exemplary of can end forming is sufficient to suggest the manner of handling the strip irrespective of its particular pattern and irrespective of the number of can end forming presses needed. The can end forming presses J and L are of conventional press construction.

Each such press comprises a reciprocating punch member 71 (see also Fig. 8) and a stationary die support unit 72. The stationary die unit carries a cut edge 75 which is mounted upon and bolted thereto. The blanking punch unit which has movement with the reciprocating punch member 71 includes a punch 76 which cooperates with the cut edge 75 to first blank the can end from the strip of stock. Punch 76, continuing its movement presses the edge of the cut out blank against a draw ring 77 which is mounted in the conventional manner upon pins which lead to the standard rubber or spring elements providing the desired yielding die elements.

The punch unit also carries a punch center 78. A movable knock-out ring 79 is mounted between the punch 76 and the punch center. This acts as a knock-out after the formation of a can end for removing the end from the die, this being a common press feature. The die support unit 72 also carries a panel forming die center 80 which cooperates with the punch center 78. A hold-down ring 81 is carried by the punch 76 and cooperates with the other die end punch parts in the conventional manner.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

I claim:

1. The method of blanking can ends in which metallic strips are secured together for the blanking of the can ends and the like so that a continuous cutting pattern of the material is obtained each strip having potential blank spaces arranged in a cutting pattern and having a row of feeding perforations for the exact positioning of the strip for the blanking thereof, which comprises transversely cutting the tail end of one strip and the leading end of a second strip to produce alignment edges each edge so cut having a predetermined relation to the feeding perforations and to the potential blank spaces in the strip, aligning the transverse edges to provide an uninterrupted extension of the cutting pattern, and securing the strips together in connections which are fully within certain potential blank spaces so that removal of such spaces also insures removal of said connections without alteration of the regular cutting pattern.

2. The method of blanking can ends in which metallic strips are secured together for the blanking of the can ends and the like so that a continuous cutting pattern of the material is obtained having potential blank spaces arranged in rows and having a row of feeding perforations the space between adjacent perforations being equal to the distance between adjacent blank spaces in a row for the exact positioning of the strip for the blanking thereof, transversely cutting the tail end of one strip and the leading end of a second strip to produce alignment edges each edge passing through a said perforation and thereby having a predetermined relation to the potential blank spaces in the strip, aligning the transverse edges to provide a continuing equal spacing of perforations in a row and an uninterrupted extension of the cutting pattern, and securing the strips together to provide a composite strip having connections fully contained within certain potential blank spaces so that the said connections are removed in subsequent blanking operations during the feeding of the composite strip.

3. The method of blanking can ends in which metallic strips are secured together for the blanking of the can ends and the like so that a continuous cutting pattern of the material is obtained each strip having a row of equally spaced feeding perforations and a corresponding row of potential blank spaces, which comprises advancing the strip by utilizing said feeding perforations, cutting out a can end from each potential blank space in said advanced strip, forming a transverse line of cut in the tail end of one strip and the same line of cut in the leading end of a second strip to produce alignment edges each having a predetermined relation to the said perforations and to the said potential blank spaces in its strip, aligning the matched transverse edges of the two strips to provide an uninterrupted extension into the second strip of the perforations in a row and of the cutting pattern, and securing the strips together in spaced connections said connections being inside of certain potential can end spaces located along the connecting line of the strips and being removed by removal of the can ends cut from said certain spaces in said can end cutting operation.

4. The method of blanking can ends in which metallic strips are secured together for the blanking of the can ends and the like so that a continuous cutting pattern of the material is obtained each strip having rows of equally spaced feeding perforations and corresponding rows of potential blank spaces, which comprises advancing the strip by utilizing said feeding perforations, cutting out a can end from each potential blank space in said advanced strip, transversely cutting by the same lines of configuration the tail end of one strip and the leading end of a second strip to produce notched and alignment edges passing through a said perforation and having a predetermined relation to said potential blank spaces in its strip, aligning the matched transverse edges of the two strips to provide an uninterrupted extension of the rows of perforations and of the cutting pattern from the first strip and into the second strip, and securing the strips together in spaced connections said connections coming inside of all of the potential can end spaces located along the connecting line between said strips and being removed with the can ends cut out during said cutting operations without alteration of said regular cutting pattern.

5. The method of blanking can ends in which metallic strips are secured together for the blanking of the can ends and the like so that a proper cutting pattern of the material is obtained without spoilage of material or of the can ends blanked therefrom, which comprises providing strips having rows of feeding perforations definitely located relative to potential blank spaces constituting a cutting pattern for the strips which comprises advancing a strip by utilizing said feeding perforations, cutting out a can end from each potential blank space in said advanced strip, transversely notching the tail end of one strip and the leading end of a second strip to produce alignment edges and extending projections each alignment edge and each projection having a predetermined relation to the potential blank spaces in its strip, positioning the alignment edges of the two strips in alignment and overlapping the projections of one strip with the projections of the other strip in a manner to provide an uninterrupted extension of the cutting pattern from the first strip into the second strip, and securing the strips together at said overlapped projections so that said connections are inside of potential can end spaces located along the juncture of the strips and are removed in said can end cutting operation.

6. The method of securing metallic strips together for the blanking of can ends and the like so that a proper cutting pattern of the material is obtained without spoilage of material or of the can ends blanked therefrom, which comprises providing strips having rows of feeding perforations in definite relationship to potential blank spaces arranged in a cutting pattern for the strip, which comprises intermittently advancing the strip by feeding engagement with said perforations, cutting out a can end from each potential blank space in said advanced strip during its period of rest, transversely notching the tail end of the strip being fed and the leading end of a second strip to be fed so that alignment edges pass through said perforations said notching cut also leaving spaced projections between sections of said alignment edges which bear a predetermined relation to said potential blank spaces, overlapping the projections of one strip onto those of the other strip and bringing into alignment the alignment edges to provide an uninterrupted extension of the cutting pattern into the second strip, and welding the overlapped projections together in such a position as to locate each welded connection inside of the outline of a can end cut from the potential can end space along the junction of the strips without any alteration of the regular cutting pattern.

JOHN E. SOCKE.